Aug. 22, 1944.   L. N. HAMPTON   2,356,583
PROCESS OF PREPARING SOLDERING COPPERS
Filed Aug. 20, 1941
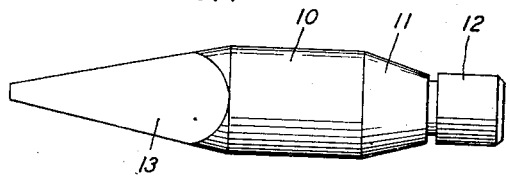
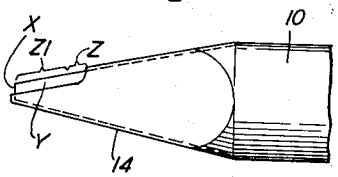
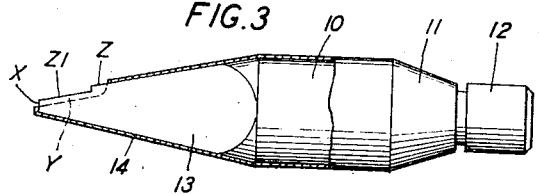
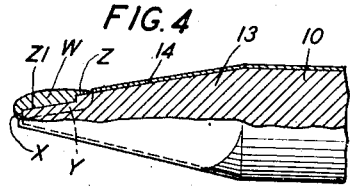
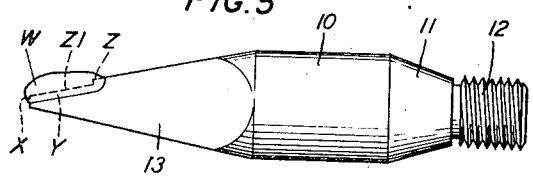
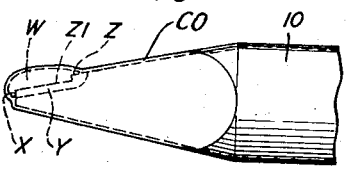
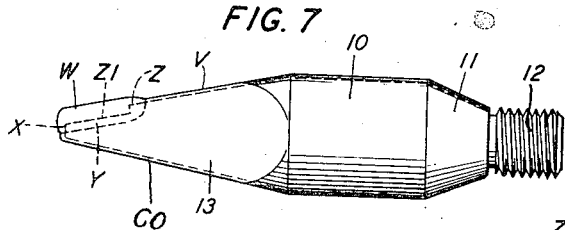
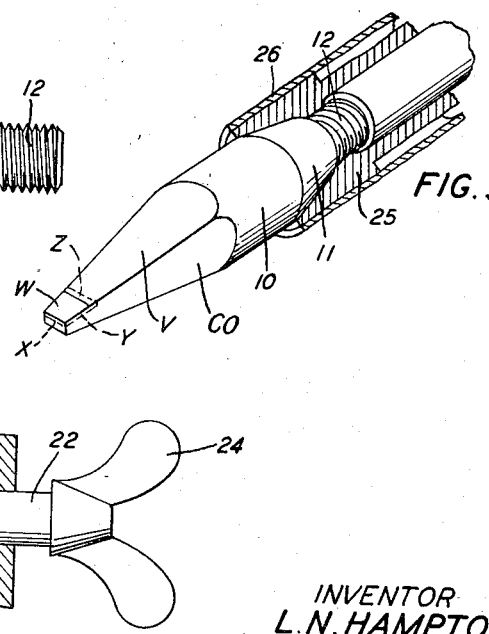
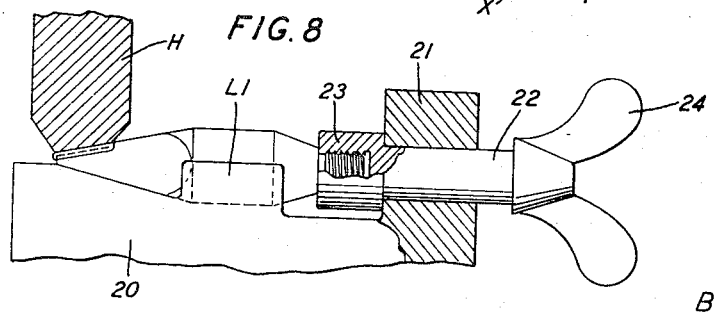
INVENTOR
L. N. HAMPTON
BY J. MacDonald
ATTORNEY Patented Aug. 22, 1944

2,356,583

UNITED STATES PATENT OFFICE 2,356,583

PROCESS OF PREPARING SOLDERING COPPERS

Leon N. Hampton, New York, N. Y., assignor to Bell Telephone Laboratories, Incorporated, New York, N. Y., a corporation of New York Application August 20, 1941, Serial No. 407,599

2 Claims. (Cl. 204—23)

This invention relates to soldering coppers and more specifically to the construction of a heat transferring element for use in such coppers.

It is an improvement over the heat transferring element disclosed in Patent 2,274,408 issued February 24, 1942, to L. N. Hampton et al. In such patent is disclosed a soldering copper using a heat transferring element comprising a copper part which is Calorized throughout its entire surface and machined at one end thereof for receiving a tip or working surface of pure iron which is welded to the machined portion, the iron part, as is well known, being substantially free of oxidation and thereby avoids frequent tinning while in operation, the Calorizing consisting in heating the copper heat-transferring element in aluminum powder for a length of time corresponding to the thickness of the aluminum coating desired. In such transferring element, however, the machining and interfitting of the copper part to that of the pure iron part, together with the welding operation of these parts in order to form a good heat path to the iron working surfaces, has been found to be too costly for general use in connection with electrically heated soldering coppers.

The present invention resides in a method of construction by which heat transferring elements for soldering copper are produced at low cost while being durable and efficient in use.

In the drawing,

Fig. 1 is a view of the copper part of the heat transferring element;

Fig. 2 is a view of the copper part shown with a coat of enamel thereon but with its working surface uncovered;

Fig. 3 is a view similar to that of Fig. 2 but with the portion of the uncovered copper machined;

Fig. 4 is a view of the heat transferring element partly in section showing the copper part, the enamel and iron electrodeposited on the machined surface of the copper;

Fig. 5 is a view of the heat transferring element with the enamel removed;

Fig. 6 is a view of the heat transferring element following its Calorizing;

Fig. 7 is a view of the heat transferring element following the machining of the electrodeposited iron;

Fig. 8 is a side view of a fixture partly in section used for forging the electrodeposited iron; and Fig. 9 is a view of the completed heat transferring element in position at the end of a tubular support.

In accordance with this invention, a heat transferring element for a soldering copper is constructed by annealing, and forging a piece of copper into a shape as shown in Fig. 1 to include a cylindrical portion 10, a conical portion 11, a reduced cylindrical portion 12 and a tapered portion 13 of rectangular cross section forming the tip or working end of the heat transferring element.

The copper body portion of the heat transferring element thus formed is afterwards covered, as shown in Fig. 2, with an enamel coating 14 on its entire surface except at points such as X, Y, Z and Z1, the surface Z1 being afterward machined as shown in Fig. 3, preparatory to iron electroplating by using an anode of pure iron this machined surface and the surface points X, Y and Z contiguous to the surface Z1, limited by the enamel 14 at this end and the heating element is now in the stage shown in Fig. 4.

This iron electroplating operation is followed, as shown in Fig. 5, by the removal of the enamel coating 14 from the body portion of the heating element after which the cylindrical portion 12 is screw-threaded, the copper part and the electrodeposited iron being now ready to receive a Calorizing coating CO shown in Fig. 6 for the purpose of preventing the tin working its way beyond the working surface W of the electrodeposited iron which is shaped, as shown in Fig. 7, by machining or grinding the surface of the iron so as to decrease its thickness to a level slightly higher than that of the surface V of the tapered portion at the end of the heat retransferring element. The iron part is afterwards annealed for denuding it of hydrogen and cold-forged so as to increase its hardness while reducing its thickness to the level of the surface V of the tapered portion above-mentioned, which forging is conveniently effected by placing the heat transferring element thus constructed in a fixture shown in Fig. 8 having two upright locating lugs L1 and an upright extending portion 21 into which is rotatably mounted a sleeve 22, this sleeve being provided at one end with an enlarged interiorly screw-threaded portion 23 for receiving the screw-threaded end 12 of the heat transferring element and on the other end of the sleeve is secured a wing nut 24 serving for rotating the sleeve 23 and thereby securing the heat transferring element in registry with the plunger H of a motor-driven forging machine, the completed heat transferring element being in the form shown in Fig. 9 with its screw-threaded portion 12 and conical portion 11, engaging similarly shaped portions in a bushing 25 at the end of a tubular support 26 shown partially in Fig. 9.

Applicant discovered that Calorizing the joint between the copper and the iron effectively prevented the tinning of these surfaces and the consequent working of the solder between the iron and the copper with the consequent loosening of the electroplated iron from the copper. Applicant further discovered that a better tinned surface was obtained by building the electroplated iron to a high level relative to the copper surface and machining such iron so as to remove any Calorizing material which may have been absorbed by the iron. Applicant further discovered that the forging of the electrodeposited iron greatly increased the density of the iron with the result that this metal was not so apt to be deteriorated by the heat and solder while in operation and this greatly increased the number of efficient soldering operations.

What is claimed is:

1. The method of forming a heat transferring element such method consisting in annealing and forging a piece of oxygen-free copper to form a cylindrical portion, a conical portion, another cylindrical portion and a tapered portion, electrodepositing iron on one face of the end of the tapered portion, heating the copper and the deposited iron portion in aluminum powder to form a coating on the copper and the iron and removing the aluminum from a portion of the iron to serve as the working surface of the element.

2. The method of forming a heat transferring element for an electrically heated soldering tool, such method consisting in annealing and forging a piece of good heat conductivity copper to form a cylindrical portion, a conical portion, a second cylindrical portion and a tapered portion, applying a coat of removable enamel to the copper outside of its working portion at the end of the tapered portion, machining such working portion, electrodepositing iron on the machined working portion, removing the enamel, heating the cylindrical portions, the conical portion, the iron portion and the tapered portion in aluminum powder to form a Calorizing coating on the copper and the iron, and partially removing the Calorizing coating from the iron to form the working portion thereof, annealing the iron for denuding it of hydrogen gas and cold-forging the iron to increase its hardness.

LEON N. HAMPTON.